(12) United States Patent
Radosz et al.

(10) Patent No.: US 8,901,031 B2
(45) Date of Patent: Dec. 2, 2014

(54) BROMINATED POLY (2,6-DIPHENYL-1,4-PHENYLENE OXIDE) AND ITS NANOCOMPOSITES AS MEMBRANES FOR $CO_2$ SEPARATION

(75) Inventors: Maciej Radosz, Laramie, WY (US); Youqing Shen, Laramie, WY (US)

(73) Assignee: University of Wyoming, Laramie, WY (US)

( * ) Notice: Subject to any disclaimer, the term of this patent is extended or adjusted under 35 U.S.C. 154(b) by 888 days.

(21) Appl. No.: 12/304,398

(22) PCT Filed: May 11, 2007

(86) PCT No.: PCT/US2007/011458
§ 371 (c)(1),
(2), (4) Date: Oct. 5, 2009

(87) PCT Pub. No.: WO2007/133708
PCT Pub. Date: Nov. 22, 2007

(65) Prior Publication Data
US 2010/0152037 A1    Jun. 17, 2010

Related U.S. Application Data

(60) Provisional application No. 60/799,506, filed on May 11, 2006.

(51) Int. Cl.
| | | |
|---|---|---|
| *C07C 43/20* | (2006.01) | |
| *B01J 20/22* | (2006.01) | |
| *B01D 53/22* | (2006.01) | |
| *B01D 69/14* | (2006.01) | |
| *B01D 69/02* | (2006.01) | |
| *C08G 65/48* | (2006.01) | |
| *C08L 71/12* | (2006.01) | |
| *B01D 71/52* | (2006.01) | |
| *B01D 71/02* | (2006.01) | |

(52) U.S. Cl.
CPC .............. *B01D 71/52* (2013.01); *B01D 53/228* (2013.01); *B01D 69/148* (2013.01); *B01D 69/02* (2013.01); *C08G 65/485* (2013.01); *B01D 2325/20* (2013.01); *B01D 71/027* (2013.01); *Y02C 10/10* (2013.01); *B01D 2257/504* (2013.01); *C08L 71/126* (2013.01); *Y10S 977/70* (2013.01)
USPC ................. 502/401; 568/642; 977/700; 95/45

(58) Field of Classification Search
None
See application file for complete search history.

(56) References Cited

U.S. PATENT DOCUMENTS 4,586,939 A * 5/1986 Li ..................................... 95/47

OTHER PUBLICATIONS

Yang et al. Journal of Polymer Science: Part A: Polymer chemistry, vol. 31, 1261-1273, 1993.*
Patel et al. Advanced Materials, 2003, 15(9), 729-733.*
SciFinder search history.*
Khaget, et al. Filled poly (2,6-dimethyl-1, 4-phenylene oxide) Dense Membranes by Silica and Silane Modified Silica Nanoparticles; Characterization and Application in Pervaporation. Polymer Nov. 14, 2005 46:9881-9891 p. 9881, abstract.

* cited by examiner

*Primary Examiner* — Yun Qian
(74) *Attorney, Agent, or Firm* — Davis, Brown, Koehn, Shors & Roberts, P.C.; Kent A. Herink

(57) ABSTRACT

Novel brominated poly(2,6-diphenyl-1,4-phenylene oxide) compounds are synthesized and found to have improved carbon dioxide separation properties, including improved carbon dioxide permeability and improved carbon dioxide/nitrogen selectivity.

4 Claims, 4 Drawing Sheets

BROMINATED POLY (2,6-DIPHENYL-1,4-PHENYLENE OXIDE) AND ITS NANOCOMPOSITES AS MEMBRANES FOR $CO_2$ SEPARATION

This application claims priority to U.S. Patent Application Ser. No. 60/799,506, filed May 11, 2006, which is incorporated herein in its entirety by this reference.

BACKGROUND OF THE INVENTION

The invention relates generally to brominated derivatives of poly(2,6-dimethyl-1,4-phenylene oxide) and, more specifically to membranes formed of the new compounds that have improved mechanical and $CO_2$-separation properties.

Poly(2,6-dimethyl-1,4-phenylene oxide) (PPO for short) is known to be a membrane material that has high $CO_2$ affinity, and hence high $CO_2$ permeability (Chowdhury, G.; Kruczek, B.; Matsuura, T. (Eds.), Polyphenylene Oxide and Modified Polyphenylene Oxide Membranes; Gas, Vapor, and Liquid Separation, Kluwer Academic, 2001, 105-145; He, Z.; Pinnau, I.; Morisato, A. Desalination 2002, 146, 11-15; Chowdhury, G.; Vujosevic, R.; Matsuura, T.; Laverty, B. J. Appl. Polym. Sci. 2000, 77, 1137-1143; Hamad, F.; Khulbe, K. C.; Matsuura, T. J. Memb. Sci. 2005, 256, 29-37; Khulbe, K. C.; Chowdhury, G.; Matsuura, T.; Lamarche, G. J. Memb. Sci. 1997, 123, 9-15). PPO properties can be improved by chemical modification. For example, Story et al. reported that substituting the aromatic ring with bromine groups can increase the $CO_2$ permeability as much as 2.5 times without sacrificing its selectively (Story, B. J.; Koros, W. J. J. Memb. Sci. 1992, 67, 191-210). Hamad et al. further improved the $CO_2$ selectivity relative to $CH_4$ by introducing a sulfonic acid group to the brominated PPO at the ring position (Hamad, F.; Matsuura, T. J. Memb. Sci. 2005, 253, 183-189).

One of the PPO derivatives that has not been explored yet as a $CO_2$ membrane material is poly(2,6-diphenyl-1,4-phenylene oxide) (DPPPO). DPPPO was synthesized by Hay et al. in the 1960's (Hay, A. S. Macromolecules 1969, 2, 107-108). DPPPO easily crystallizes with a Tm of about 470° C., which is near its decomposition temperature, which will adversely impact its processing and mechanical properties (Yang, H.; Hay, A. S. J. Polym. Sci. 1993, 31, 1261-73). Preferred embodiments of the present invention are focused on other PPO modifications, such as brominated DPPPO and nanoparticle-containing DPPPO.

SUMMARY OF THE INVENTION

We synthesized and characterized a new brominated derivative of DPPPO, BDPPPO for short, and its silica nanocomposite, and compared its $CO_2$ membrane properties against PPO and DPPPO. The new BDPPPO membranes exhibit better mechanical and $CO_2$-separation properties. For example, they exhibit higher $CO_2$ permeability (about 40% higher relative to DPPPO and about 250% higher relative to PPO) and higher $CO_2/N_2$ selectivity, referred to as permselectivity (about 75% higher relative to DPPPO and about 90% relative to PPO). Furthermore, a mixture of BDPPPO and silica ($SiO_2$) nanoparticles is demonstrated to form a compatible nanocomposite that exhibits superior separation properties. For example, a BDPPPO-silica nanocomposite containing 20% wt 10 nm silica particles can further improve the $CO_2$ permeability by about 170% relative to plain BDPPPO without changing the permselectivity much.

DETAILED DESCRIPTION OF PREFERRED EMBODIMENTS

Experimental Approach

Figure 1:
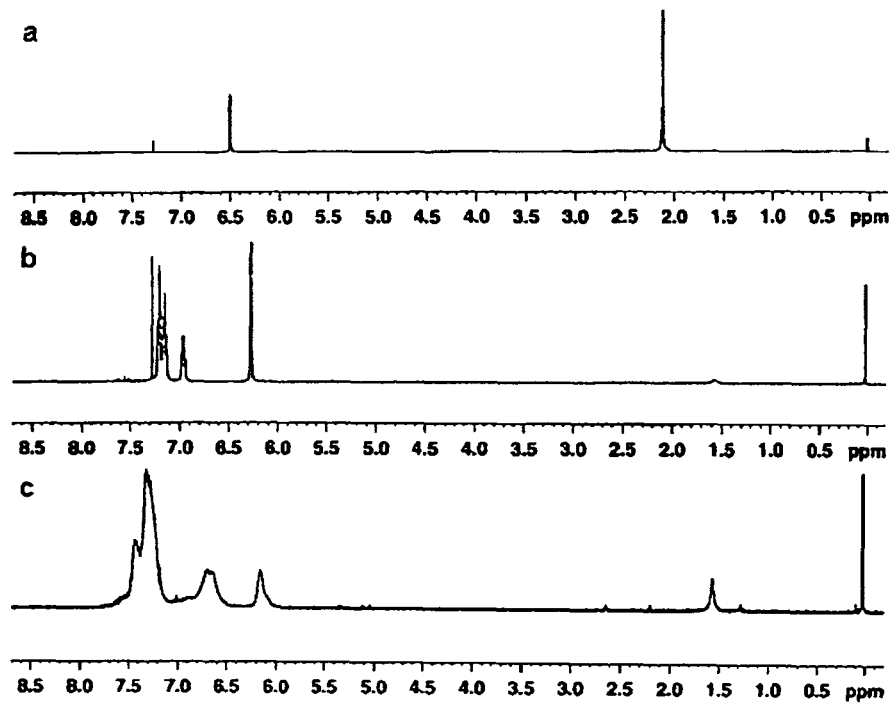
FIG. 1 is a chart of $^1$H-NMR spectra of (a)PPO, (b)DPPPO, and (c) BDPPPO.

Chemicals: PPO (Mn~25000, polydispersity~2.0), 2,6-diphenylphenol (98%), N,N,N',N'-tetramethylethylenediamine (TMEDA, 99%), bromine ($Br_2$, 99.5+ %), chloroform ($CHCl_3$, 99.8%), methanol (99.8+ %), ethanol (99.5% +), 1,2-dichlorobenzene (99%), anhydrous hydrazine (98%), silicon dioxide nanopowder ($SiO_2$, 10 nm, 99.5%) were purchased from Aldrich and used as received. Copper(I) chloride (CuCl, 93.2%), which was purchased from J. T. Baker Chemical Co., was stirred with glacial acetic acid, filtered, washed with ethanol, and dried.

Synthesis of DPPPO: Synthesis of DPPPO was carried out according to the method of Hay. In a typical procedure, 0.041 g of CuCl, 0.031 g of TMEDA, 2 g of anhydrous magnesium sulfate, and 35 ml of 1,2-dichlorobenzene was added to a 100 ml flask. The flask was placed in an oil bath at 65° C., stirred, and saturated with oxygen for 10 min. When the solution turned green, a solution of 5 g of 2,6-diphenylphenol in 40 ml of 1,2-dichlorobenzene was added slowly for 20 min. At that point, the reaction solution became dark red. The reaction continued for 24 h. When the reaction was complete, several drops of anhydrous hydrazine were added to reduce the diphenoquinone byproducts. The inorganic solids were then removed by filtration. The polymer was precipitated by adding the solution dropwise to 400 ml of methanol containing several drops of hydrazine. After stirring for several hours, the precipitated polymer was collected by filtration, then redissolved in 40 mL of chloroform, and precipitated in 400 mL of methanol. The polymer was again filtered, dried in a vacuum oven at 80° C. for 24 h, and characterized: 3 g, [η]=0.58, Mn~150000.

Synthesis of BDPPPO: Five g of DPPPO and 50 ml of $CHCl_3$ was stirred in a 100 ml flask. A solution of 10 ml of bromine in 10 ml of chloroform was added dropwise to the mixture over a 30-minute period. The mixture maintained a dark red color throughout the bromination reaction. An argon purge was maintained to remove HBr released from the solution. After stirring at room temperature for 1 hour, the polymer was precipitated in 800 ml of mechanically stirred ethanol, filtered, and dried under vacuum at room temperature. Its total yield was 7 g.

Characterization: $^1$H-NMR analyses of 2% w/w solutions of the PPO, DPPPO and BDPPPO samples in deuterated choloroform were made using a Bruker Advance DRX-400 spectrometer. The glass transition temperatures (Tg) were determined using a differential scanning calorimeter, TA Instruments, model QP10, at a heating rate of 20° C./min. All tests were repeated at least twice to ensure reproducibility.

Gas permeation testing: Membranes of PPO, DPPPO and BDPPPO were cast on a glass plate at room temperature from 3% w/w solutions of chloroform. A constant-volume variable-pressure apparatus was used for testing gas permeation. All experiments were preformed at 22° C. and 21 psi feed pressure.

Results and Discussion

The PPO derivatives synthesized for this study are shown in Scheme 1. DPPPO is a white powder and BDPPPO is a yellow powder.

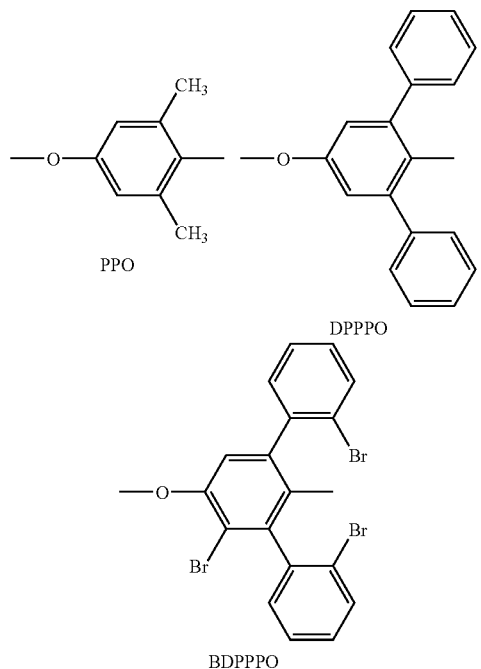

Scheme 1. Polymer Structures

Figure 2:
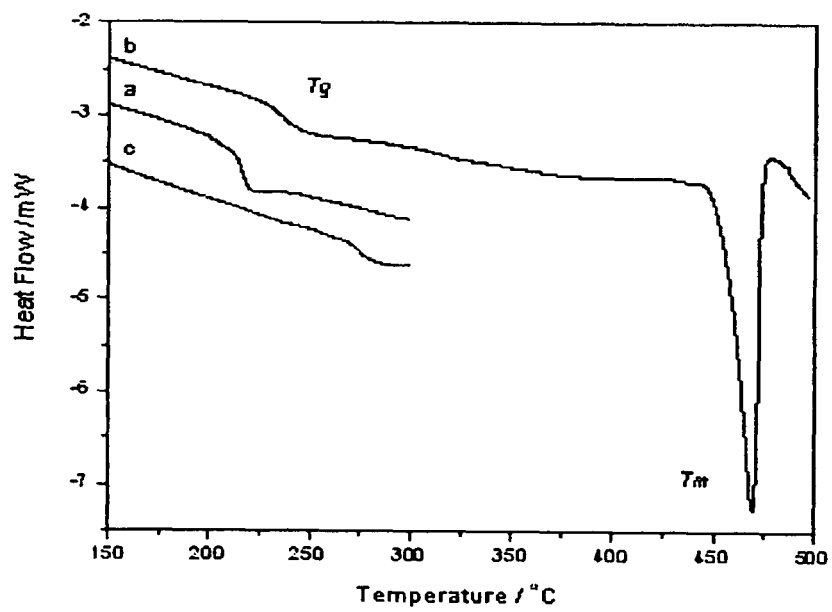
FIG. 2 is a graphical representation of the DSC curves of (a)PPO, (b) DPPPO, and (c) BDPPPO.

The $^1$H-NMR spectra of PPO, DPPPO and BDPPPO are shown in FIG. 1. The DSC curves of PPO, DPPPO and BDPPPO are shown in FIG. 2. The Tg's of PPO, DPPPO and BDPPPO are 216° C., 235° C., and 275° C., respectively, obtained by differential scanning calorimetry (DSC). FIG. 2 suggests that DPPPO is crystalline, with a melting point (Tm) of 470° C., while BDPPPO is amorphous.

PPO, DPPPO and BDPPPO are found to form good membranes by casting 3% w/w solutions on glass plates at room temperature. As shown in Table 1, among these three polymeric membranes, the BDPPPO membrane has the highest $CO_2$ permeability and the highest $CO_2/N_2$ permselectivity. The DPPPO membrane, on the other hand, has the lowest $CO_2$ permeability due to its high crystallinity. Relative to PPO, the BDPPPO permselectivity is two times higher and its permeability is about 40% higher. Relative to DPPPO, the BDPPPO permeability and permselectivity are much higher, 3.5 and 1.7 times, respectively. PPO-silica, DPPPO-silica and BDPPPO-silica membranes were cast by mixing the polymers and 20% wt/wt of 10 nm $SiO_2$ nanoparticles in a solvent. The PPO-silica and DPPPO-silica membranes are found to be heterogeneous, that is phase separated, which leads to poor mechanical properties. By contrast, the BDPPPO-silica membrane is found to be uniform, which leads to very good mechanical properties. Its $CO_2/N_2$ permeation data given in Table 1 suggest that the silica nanoparticles further improve the $CO_2$ permeability by about 170% relative to plain BDP-PPO without changing the permselectivity much.

TABLE 1

Results of $CO_2/N_2$ separation.

| Polymer membrane | $CO_2$ permeability (Barrer) | $N_2$ permeability (Barrer) | $CO_2/N_2$ permselectivity |
|---|---|---|---|
| PPO | 66.0 | 4.5 | 14.7 |
| DPPPO | 26.0 | 1.6 | 16.3 |
| BDPPPO | 90.2 | 3.2 | 28.2 |
| BDPPPO/silica | 240.0 | 8.2 | 29.3 |

Figure 3A:
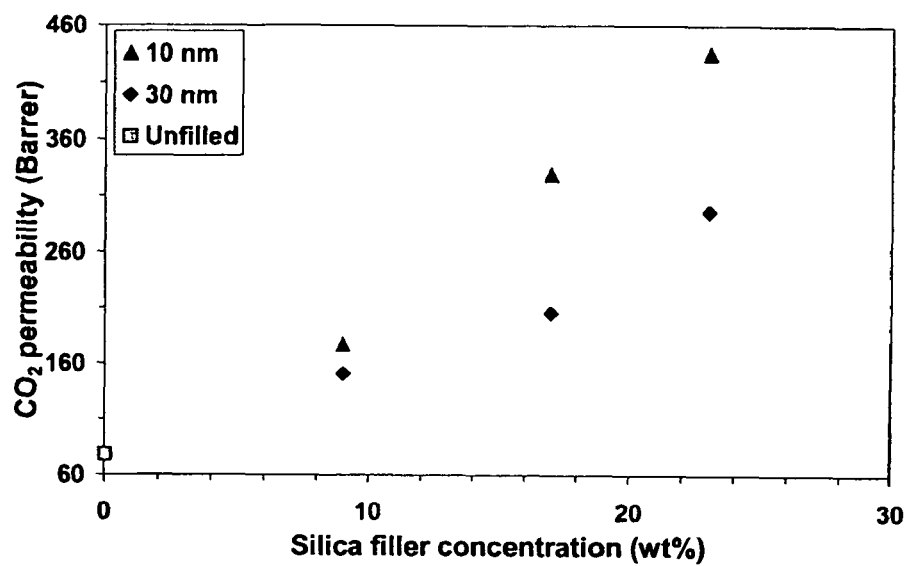
FIG. 3 is a graphical representation of the gas permeability of BDPPPO/silica nanocomposite membrane as a function of the silica concentration at 10-psig feed pressure and room temperature.
Figure 3B:
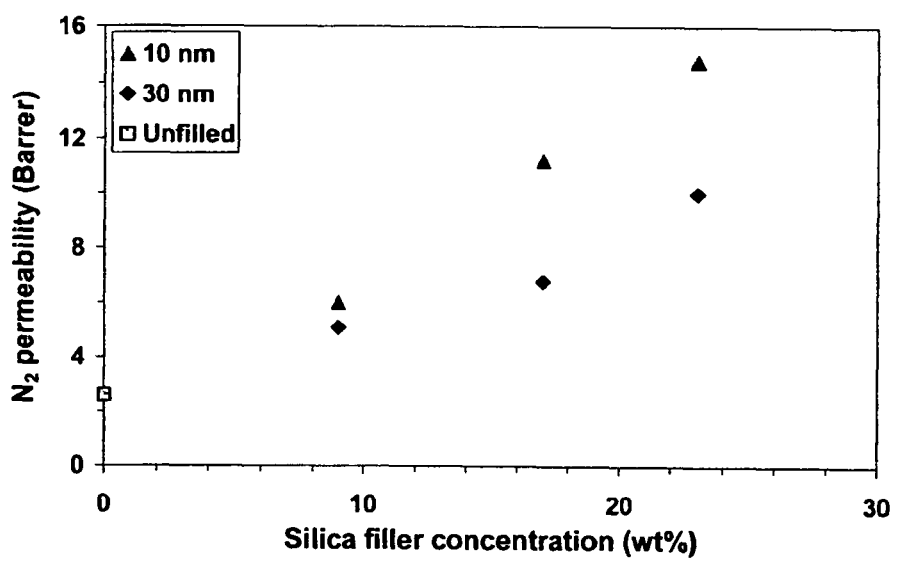
Figure 3C:
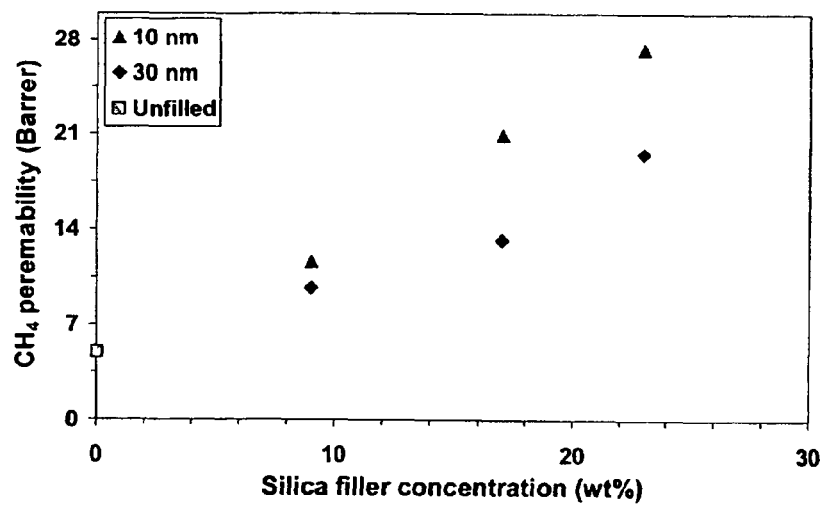
Figure 4A:
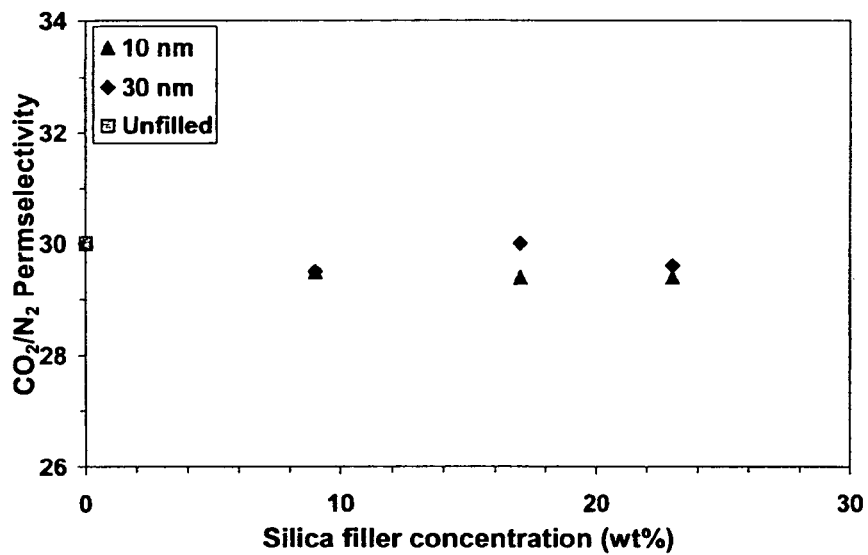
FIG. 4 is a graphical representation of the gas selectivity of the BDPPPO/silica nanocomposite membrane as a function of the silica concentration at 10-psig feed pressure and room temperature.
Figure 4B:
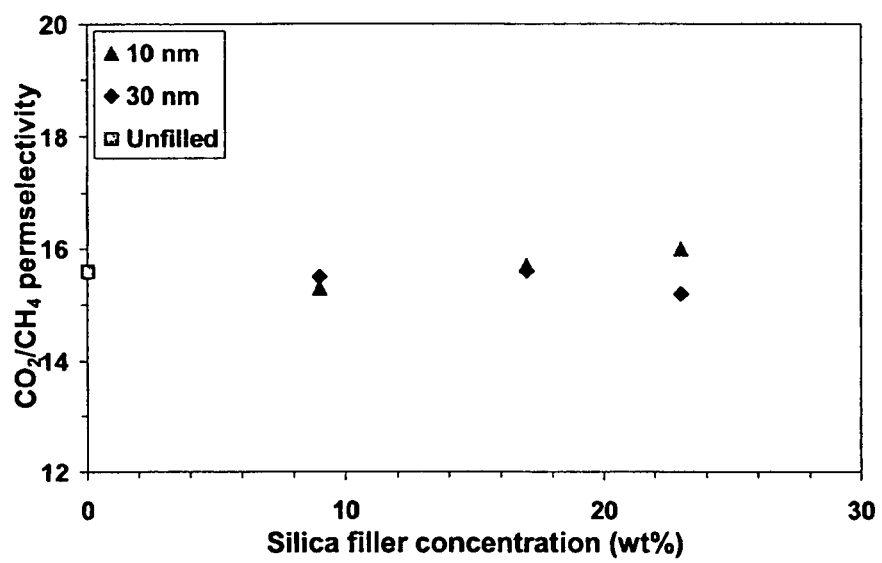

Chloroform solutions of PPO, DPPO, and BDPPPO were mixed with 9, 17, and 23 wt-% of 10 and 30 nm-silica nanoparticles (NPs) and used to cast membranes. Such nanocomposite BDPPPO/silica membranes are more homogeneous than DMPPO/silica and DPPPO/silica membranes, and remain flexible up to about 23 wt-% of silica in the membranes. The permeability and slectivity (ideal selectivity, or permselectivity) of the BDPPPO/silica membranes as a function of the silica weight percentage and silica nanoparticle size are illustrated in FIGS. 3-4. The permeabilities of all the gases increase with increasing the silica concentration. The $P_{CO2}$ of the BDPPPO/10-nm-silica membrane is 177 Barrer at 9 wt-% of silica and reaches 436 Barrer at 23 wt-%, about 5.6 times that of the pure BDPPPO membrane, while selectivity remains unchanged.

In FIG. 4, the $CO_2/N_2$ and $CO_2/CH_4$ selectivities in BDP-PPO/silica membranes remain almost the same as those for the pure BDPPPO membranes, which shows that silica enhances the gas permeability without deteriorating the membrane selectivity.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing from the scope of the invention.

We claim:

1. A composition formed by a process comprising the steps of:
   (a) combining poly(2,6-diphenyl-1,4-phenylene oxide) and a mineral acid in a reaction vessel;
   (b) adding a source of bromine to the reaction vessel to create a reaction mixture;
   (c) purging the reaction mixture with an inert gas to remove HBr released from the reaction mixture until the reaction is complete;
   (d) adding an alcohol to precipitate the formed tri-brominated poly(2,6-diphenyl-1,4-phenylene oxide) within the mixture; and
   (e) filtering the mixture to obtain tri-brominated poly(2,6-diphenyl-1,4-phenylene oxide),
   wherein said composition comprise polymers of tri-brominated poly(2,6-diphenyl-1,4-phenylene oxide) having a constitutional unit denoted by the general formula shown below, wherein said composition has a glass transition temperature of 275° C., a $CO_2$ permeability of 90.2 Barrer, a $N_2$ permeability of 3.2 Barrer and $CO_2/N_2$ permselectivity of 29.3

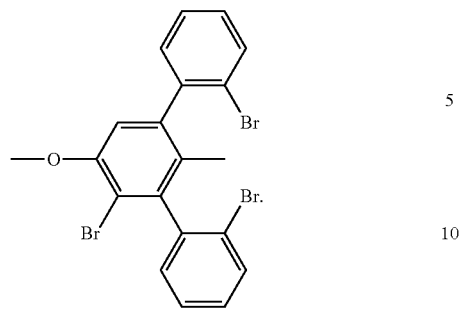
2. The composition of claim 1, wherein the mineral acid is hydrochloric acid.
3. The composition of claim 1, wherein the inert gas is argon.
4. The composition of claim 1, wherein the alcohol is ethanol.
* * * * *